(12) United States Patent
Echevarria Vallespi et al.

(10) Patent No.: US 12,561,854 B2
(45) Date of Patent: Feb. 24, 2026

(54) EXTRACTING GAMUT POLYGONS AND GENERATING COLOR MIXING STRINGS FROM COLOR PALETTES

(71) Applicant: Adobe Inc., San Jose, CA (US)

(72) Inventors: Jose Ignacio Echevarria Vallespi, South San Francisco, CA (US); Apoorva, Noida (IN)

(73) Assignee: Adobe Inc., San Jose, CA (US)

( * ) Notice: Subject to any disclaimer, the term of this patent is extended or adjusted under 35 U.S.C. 154(b) by 134 days.

(21) Appl. No.: 18/344,506

(22) Filed: Jun. 29, 2023

(65) Prior Publication Data

US 2025/0005814 A1     Jan. 2, 2025

(51) Int. Cl.
| | |
|---|---|
| *G06T 11/00* | (2006.01) |
| *G06F 3/04845* | (2022.01) |
| *G06V 10/56* | (2022.01) |
| *G06V 10/60* | (2022.01) |

(52) U.S. Cl.
CPC ........ *G06T 11/001* (2013.01); *G06F 3/04845* (2013.01); *G06V 10/56* (2022.01); *G06V 10/60* (2022.01)

(58) Field of Classification Search
CPC ... G06T 11/001; G06F 3/04845; G06V 10/56; G06V 10/60
See application file for complete search history.

(56) References Cited

U.S. PATENT DOCUMENTS

| | | | | |
|---|---|---|---|---|
| 5,416,890 | A * | 5/1995 | Beretta ................ | H04N 1/6058 |
| | | | | 345/590 |
| 9,245,350 | B1 * | 1/2016 | Dorner .................... | G06T 11/60 |
| 11,290,696 | B2 * | 3/2022 | Stauder ................ | H04N 1/6063 |
| 2008/0205755 | A1 * | 8/2008 | Jackson ................ | G06V 10/56 |
| | | | | 382/168 |
| 2012/0286700 | A1 * | 11/2012 | Maxik .................. | G09G 3/3413 |
| | | | | 315/312 |
| 2015/0193950 | A1 * | 7/2015 | Smolic .................... | G06T 15/60 |
| | | | | 345/589 |
| 2018/0122103 | A1 * | 5/2018 | Chen ..................... | G06T 11/001 |

OTHER PUBLICATIONS

"Adobe Color," color.adobe.com, webpage <https://color.adobe.com/create/color-wheel>, retrieved on Aug. 18, 2023.
(Continued)

*Primary Examiner* — Said Broome
*Assistant Examiner* — Jordan Wan Yick
(74) *Attorney, Agent, or Firm* — Keller Preece PLLC

(57) ABSTRACT

The present disclosure relates to systems, non-transitory computer-readable media, and methods for generating and utilizing a gamut polygon to generate a custom color palette. For example, the disclosed systems can generate, from an input color palette comprising a set of colors, a gamut polygon that encompasses the set of colors within a color space. Additionally, the disclosed systems can determine primary colors, secondary colors, and a neutral color utilizing the gamut polygon. Further, the disclosed systems can generate a color mixing string from the primary colors, the secondary colors, and the neutral color. The disclosed systems can also provide the color mixing string for display via a user interface of a client device.

20 Claims, 8 Drawing Sheets

(56) References Cited

OTHER PUBLICATIONS

"Color tools for design systems," leonardocolor.io, webpage <https://leonardocolor.io/#>, retrieved on Oct. 12, 2023.

"Data Color Picker powered by Learn UI Design," learnui.design/tools/data-color-picker.html, webpage <https://www.learnui.design/tools/data-color-picker.html>, retrieved on Oct. 12, 2023.

Chang et al., 2015, "Palette-Based Photo Recoloring".

DiVerdi et al., 2019, "Generating Playful Palettes from Images".

Gurney, 2010, "Color and Light—A Guide for the Relist Painter".

Pickard et al, 2021, "Artists' Master Series—Color & Light".

Shugrina et al., 2017, "Playful Palette: An Interactive Parametric Color Mixer for Artists".

Shugrina et al., 2019, "Color Builder: A Direct Manipulation Interface for Versitile Color Theme Authoring".

Tan et al., 2018, "Efficient Palette-Based Decomposition and Recoloring of Images via RGBXY-Space Geometry".

Tan et al., 2019, "Pigmento: Pigment-Based Image Analysis and Editing".

* cited by examiner

700

Generating, From An Input Color Palette Comprising A Set Of Colors, A Gamut Polygon That Encompasses The Set Of Colors *702*

Determining Colors For A Color Palette Utilizing The Gamut Polygon *704*

Generating A Color Mixing String For The Color Palette *706*

Providing The Color Mixing String For Display *708*

812

Computing Device
800

Processor
802

Memory
804

Storage
806

I/O Interface
808

Communication Interface
810

EXTRACTING GAMUT POLYGONS AND GENERATING COLOR MIXING STRINGS FROM COLOR PALETTES

BACKGROUND

Recent years have seen significant improvements in hardware and software platforms for digital content creation. To illustrate, some software applications generate a variety of digital art documents and corresponding digital content elements utilizing various colors and generative tools. In many implementations, such software applications utilize client device inputs to select pertinent colors for generating digital design elements. However, a number of problems and issues exist with regard to state of the art approaches for intelligent color generation and utilization in creating digital content, particularly with regard to flexibility, accuracy, and efficiency of implementing computing devices.

BRIEF SUMMARY

Embodiments of the present disclosure provide benefits and/or solve one or more of the foregoing or other problems in the art with systems, non-transitory computer-readable media, and methods for extracting gamut polygons and generating color mixing strings from color palettes. In particular, given an input color palette, the disclosed systems can automatically and intelligently estimate color inter-relationships and precompute a set of mixing strings to assist in accessing the color gamut defined by the input palette (e.g., without the need to use a client device color selection tool). To illustrate, in one or more embodiments, the disclosed systems receive an input color palette including a set of colors. In some embodiments, the disclosed systems generate a gamut polygon within a color space based on the set of colors. Additionally, in one or more embodiments, the disclosed systems utilize the gamut polygon to intelligently determine primary colors, secondary colors, and a neutral color. Further, in some embodiments, the disclosed systems generate color mixing strings from the primary colors, secondary colors, and the neutral color and provide the mixing strings for display via a user interface for utilization in generating digital design documents.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
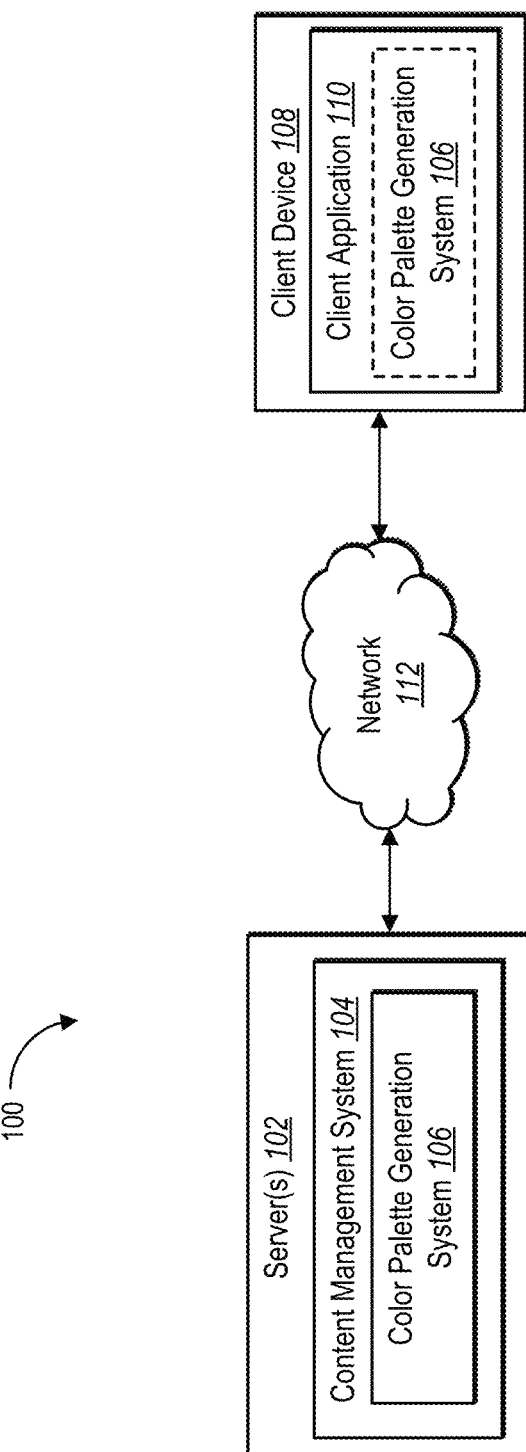
FIG. 1 illustrates a diagram of an environment in which a color palette generation system can operate in accordance with one or more embodiments.

This disclosure describes one or more embodiments of a color palette generation system that generates a gamut polygon in a color space based on an input color palette and utilizes that gamut polygon to generate a custom color palette with primary colors, secondary colors, and a neutral color. The color palette generation system provides many advantages and benefits over conventional systems and methods. For example, may conventional systems are rigid and inflexible. To illustrate, conventional systems utilize rigid digital color selection tools that require client devices to iteratively choose individual colors to use. Moreover, some conventional systems utilize aesthetic or accessibility guidelines to select complimentary colors for pre-generated color palettes. Although such systems can determine complimentary colors, the rigid guidelines fail to provide flexibility for different inputs and applications.

Further, many conventional systems are inefficient. More specifically, conventional systems require excessive user interaction to select colors, mix colors, arrange colors, and/or designate colors for a color palette. Some conventional systems require repeated navigation through predetermined palettes to select or utilize various colors. Thus, conventional systems require excessive, time, user interactions, user interfaces, and computing resources (e.g., storage and memory) in generating color palettes for utilization in digital design.

Furthermore, conventional systems are inaccurate in generating cohesive colors for utilization in digital design documents. For example, conventional systems that rely on client devices to select individual colors often result in conflicting or non-optimal color combinations. Moreover, conventional systems that utilize pre-defined color palettes fail to accurately align colors to the particular context or features of a particular digital design document.

The color palette generation system provides improved flexibility in generating and providing custom color palettes. For example, by utilizing a gamut polygon to generate a custom color palette, the color palette generation system improves flexibility relative to conventional systems. Specifically, the color palette generation system determines a gamut polygon utilizing the locations of colors from the input color palette in a color space. Accordingly, the color palette generation system can generate additional colors from an input color palette that enhance and coordinate with the input color palette by utilizing the locations of colors from the input color palette in a color space relative to one another. This allows improved flexibility by enabling the selection of new coordinating colors for a custom color palette.

Additionally, the color palette generation system provides increased efficiency in generating and providing custom color palettes. To illustrate, as mentioned above, the color palette generation system utilizes a gamut polygon to determine primary colors, secondary colors, and a neutral color for a custom color palette based on an input color palette. Further, the color palette generation system generates mixing strings with shades of each color in the custom color palette. Additionally, the color palette generation system arranges the mixing strings and provides them in a graphical user interface. Accordingly, the color palette generation system can reduce or eliminate excess time, user interfaces, interactions, and computing resources required by conventional systems.

The color palette generation system can also improve accuracy and viability of resulting color strings. For example, the color palette generation system can intelligently generate a mixing string that accurately aligns to a set of input colors. Thus, the color palette generation system can select primary colors, secondary colors, and neutral colors utilizing a gamut polygon to generate a mixing string that accurately and cohesively aligns to the context of a particular digital design document or input palette.

In one or more embodiments, the color palette generation system generates a gamut polygon in a color space utilizing the locations of colors from the input color palette as vertices. Further, in some embodiments the color palette generation system generates secondary and neutral colors utilizing the gamut polygon. Additionally, in one or more embodiments, the color palette generation system generates color mixing strings for the colors in the custom color palette and provides them to the user via a graphical user interface.

As just mentioned, in one or more embodiments, the color palette generation system generates a gamut polygon. To illustrate, in one or more embodiments, the color palette generation system determines coordinates in a color space for each of a set of colors in an input color palette. Further, in some embodiments, the color palette generation system generates the gamut polygon with vertices at the coordinates at the locations of colors from the set of colors in the color space.

More specifically, in one or more embodiments, the color palette generation system generates a triangle having the greatest area subject to the constraint of having vertices at the coordinates of the locations of colors from the input color palette. Additionally, in some embodiments, the color palette generation system verifies that each color from the input palette is encompassed within a threshold distance of the gamut polygon. In some embodiments, in response to determining that one or more colors from the input color palette are not encompassed within a threshold distance of the gamut polygon, the color palette generation system generates a quadrilateral gamut polygon having the greatest area subject to the constraint of having vertices at the coordinates of the locations of colors from the input color palette.

Further, in one or more embodiments, the color palette generation system utilizes the gamut polygon to generate secondary colors and a neutral color. In some embodiments, the color palette generation system determines primary colors as the colors at the vertices of the gamut polygon. Also, in one or more embodiments, the color palette generation system generates secondary colors by determining a midpoint between each set of the primary colors. Additionally, in some embodiments, the color palette generation system determines a neutral color as a centroid of the gamut polygon. In addition, or in the alternative, in some embodiments, the color palette generation system utilizes a physically-based color mixing model to determine the secondary colors and the neutral color based on the primary colors.

Upon determining the secondary colors and the neutral color, in one or more embodiments, the color palette generation system generates a custom color palette based on the input color palette. More specifically, the color palette generation system generates the custom color palette including each of the set of colors from the input color palette, the secondary colors, and the neutral color. In some embodiments, the color palette generation system generates an ordering or arrangement for the custom color palette.

Additionally, in some embodiments, the color palette generation system generates color mixing strings for the custom color palette. To illustrate, in one or more embodiments, the color palette generation system determines a palette white by identifying a color in the input color palette within a threshold distance of pure white. In some embodiments, if no such color is found, the color palette generation system selects pure white as the palette white. In one or more embodiments, the color palette generation system generates lighter shades for each of the colors in the custom color palette by mixing the colors with the palette white. Further, in some embodiments, the color palette generation system generates darker shades for each of the colors in the custom palette by decreasing the darkness value for the color.

Further, in one or more embodiments, the color palette generation system arranges the color mixing strings in rows from darkest to lightest. In some embodiments, the color palette generation system provides the color mixing strings together in a color palette graphical user interface. Additionally, in one or more embodiments, the color palette generation system can generate a selectable element for each color and shade in the color mixing strings.

Additional detail will now be provided in relation to illustrative figures portraying example embodiments and implementations of the persona group system. For example, FIG. 1 illustrates a computing system environment (or "environment") 100 in which a color palette generation system 106 operates. As illustrated in FIG. 1, the system 100 includes server(s) 102, a client device 108, and a network 112.

Although the system 100 of FIG. 1 is depicted as having a particular number of components, the system 100 is capable of having any number of additional or alternative components (e.g., any number of servers, client devices, or other components in communication with the color palette generation system 106 via the network 112). Similarly, although FIG. 1 illustrates a particular arrangement of the server(s) 102, the network 112, and the client device 108 various additional arrangements are possible.

The server(s) 102, the client device 108, and the network 112 are communicatively coupled with each other either directly or indirectly (e.g., through the network 112 as discussed in greater detail below in relation to FIG. 8). Moreover, the server(s) 102 and client device 108 include one or more of a variety of computing devices (including one or more computing devices as discussed in greater detail with relation to FIG. 8).

As mentioned above, the system 100 includes the server(s) 102. In one or more embodiments, the server(s) 102 generate, store, receive, and/or transmit data including digital data related to user input, input color palettes, custom color palettes, primary colors, secondary colors, neutral colors, mixing strings, etc. In one or more embodiments, the server(s) 102 comprise a data server. In some implementations, the server(s) 102 comprise a communication server or a web-hosting server.

In one or more embodiments, the server(s) 102 include a content management system 104. In some embodiments, the content management system 104 manages the generation, modification, storage, and/or distribution of digital content to client devices (e.g., the client device 108). For example, in some instances, the content management system 104 manages digital content that utilizes a custom color palette and/or a gamut polygon. In some implementations, the content management system 104 provides digital content for display via one or more digital platforms that are accessed by the client devices.

Additionally, in one or more embodiments, the client devices 108 include computing devices that access digital platforms and/or display digital content. For example, the client device 108 include smartphones, tablets, desktop computers, laptop computers, head-mounted-display devices, or other electronic devices. The client device 108 include one or more applications (e.g., the client application 110) that access digital platforms and/or display digital content. For example, in one or more embodiments, the client application 110 includes a software application installed on the client device 108. Additionally, or alternatively, the client application 110 includes a web browser or other application that accesses a software application hosted on the server(s) 102 (and supported by the content management system 104).

The color palette generation system 106 is able to be implemented in whole, or in part, by the individual elements of the system 100. Indeed, although FIG. 1 illustrates the color palette generation system 106 implemented with regard to the server(s) 102 and, optionally, the client device 108, different components of the color palette generation system 106 are able to be implemented by a variety of devices within the system 100. For example, in some cases, one or more (or all) components of the color palette generation system 106 are implemented by a different computing device (e.g., the client device 108) or a separate server from the server(s) 102 hosting the content management system 104. Indeed, as shown in FIG. 1, the client device 108 include the color palette generation system 106. Example components of the color palette generation system 106 will be described below (e.g., with regard to FIG. 6).

Figure 2:
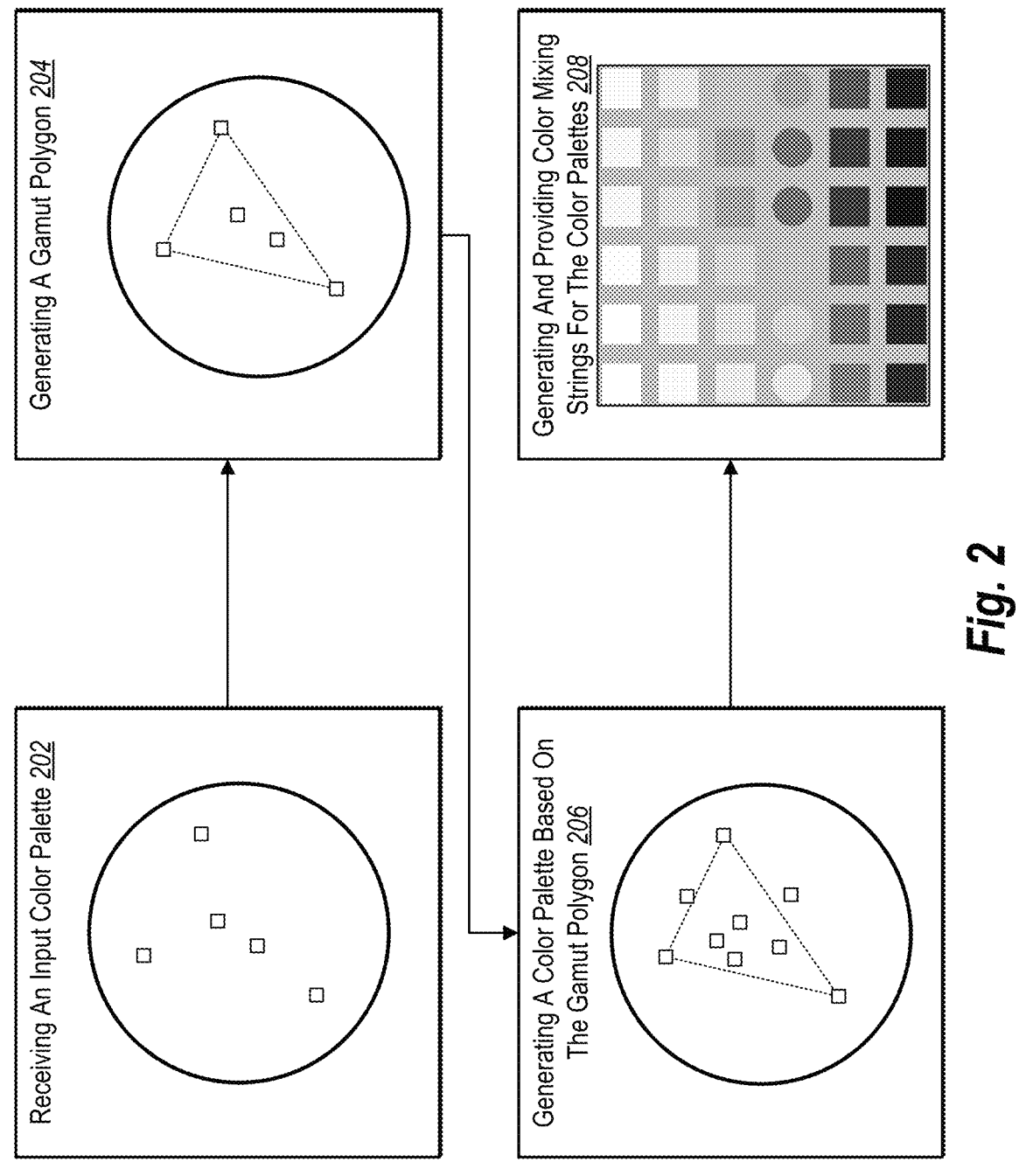
FIG. 2 illustrates an overview for generating and utilizing a gamut polygon to generate color mixing strings for a custom color palette in accordance with one or more embodiments.

As discussed above, the color palette generation system 106 can generate and utilize a gamut polygon to generate a custom color palette from an input color palette. For instance, FIG. 2 illustrates an overview of a process for generating and providing color mixing strings for a color palette. As shown in FIG. 2, the color palette generation system 106 performs an act 202 of receiving an input color palette. For example, in one or more embodiments, the color palette generation system 106 receives user selection of a color palette. To illustrate, in some embodiments, the color palette generation system 106 receives user selection of individual colors. In addition, or in the alternative, in one or more embodiments, the color palette generation system 106 receives user selection of an existing color palette as the input color palette. For example, the color palette generation system 106 can identify colors already utilized in a digital design document.

Further, as shown in FIG. 2, the color palette generation system 106 can perform an act 204 of generating a gamut polygon. In one or more embodiments, a gamut polygon can be a shape within a color space based on an input color palette. In particular, a gamut polygon can include a line, a triangle, a quadrilateral, or another shape in a color space with vertices at coordinates of primary colors from an input color palette. To illustrate, a gamut polygon can include a shape in a color space where each color from an input color palette is mapped onto its coordinates in a color space.

Further, a gamut polygon can include a shape for which each of a set of colors from an input color palette is encompassed within a threshold distance. In addition, or in the alternative, a gamut polygon can include a shape that has the greatest area within the constraints of having a particular number of vertices at coordinates of colors from the input color palette. Relatedly, in one or more embodiments, a candidate gamut polygon can include a potential gamut polygon generated by the color palette generation system, regardless of whether the gamut polygon is selected for use.

More specifically, in one or more embodiments, the color palette generation system 106 generates a gamut polygon based on the colors in the input color palette. In one or more embodiments, the color palette generation system 106 generates the gamut polygon based on area of the gamut polygon. For instance, the color palette generation system 106 can generate a gamut polygon to maximize the area of the gamut polygon. Additionally, in some embodiments, the color palette generation system 106 generates the gamut polygon to ensure that each color from the input color palette is encompassed within a threshold distance of the gamut polygon.

In one or more embodiments, an input color palette is a set of colors input into a system. In particular, an input color palette can include a set of colors submitted by a user for generation of a custom color palette. To illustrate, an input color palette can include individual user color selections, user selection of a saved set of colors, or another user-indicated set of colors.

In one or more embodiments, the color palette generation system 106 generates a gamut polygon by mapping the colors from the input color palette onto coordinates in a color space. Accordingly, the color palette generation system 106 can generate the gamut polygon having vertices at the coordinates of colors of the input color palette. Thus, the gamut polygon reflects the color gamut contained within the input color palette.

In one or more embodiments, a color space is an organization of colors within a coordinate system. In particular, a color space can include a two-dimensional arrangement of colors. The palette generation system can utilize a variety of different color models based on various attributes, such as hue, saturation, lightness, value, brightness, chroma, additive color mixing, or subtractive color mixing. To illustrate, a color space can include an organization of a variety of different color models, including HSL (hue saturation lightness), HSV (hue saturation value), RGB (red green blue), CMYK (cyan magenta, yellow, black), hexachrome, YUV (luminance, blue projection, red projection), or another arrangement of colors.

In one or more embodiments, the color palette generation system 106 checks for valid gamut triangles and, if none are found, the color palette generation system 106 generates a gamut quadrilateral. To illustrate, the color palette generation system 106 generates candidate gamut triangles and selects the candidate gamut triangle having the largest area. Additionally, the color palette generation system 106 can verify that each color from the input color palette is encompassed within a threshold distance of the gamut triangle.

Upon determining that each color from the input color palette is indeed encompassed within a threshold distance of the gamut triangle, the color palette generation system 106 can select the gamut triangle as the gamut polygon. However, upon determining that at least one color from the input color palette is not encompassed within the threshold distance of the gamut triangle, the color palette generation system 106 can generate candidate gamut quadrilaterals. In some embodiments, the color palette generation system 106 selects a gamut quadrilateral having the largest area as the gamut polygon.

Additionally, as shown in FIG. 2, the color palette generation system 106 can perform an act 206 of generating a color palette based on the gamut polygon. To illustrate, in one or more embodiments, the color palette generation system 106 identifies primary colors for the custom color palette by selecting the colors at the vertices of the gamut polygon. In one or more embodiments, primary colors are colors selected for a color palette that reflect the range of the color palette. For instance, primary colors include a group of colors from which other colors in a color palette can be obtained (by mixing). In some implementations, the palette generation system selects the primary colors from the vertices of a gamut polygon. To illustrate, a primary color can be relative to a color palette and accordingly can include a variety of colors depending on the color palette. A primary color is not limited to red, yellow, or blue.

Further, the color palette generation system 106 can generate secondary colors for the custom color palette by identifying a midpoint along each edge of the gamut polygon. In one or more embodiments, a secondary color is a color generated by mixing two primary colors. More specifically, secondary colors can include colors determined by finding a midpoint in a color space between two primary colors. In addition, or in the alternative, a secondary color can be a color determined by utilizing a physically-based color mixing model to mix two primary colors. To illustrate, a secondary color can be relative to a color palette and accordingly can include a variety of colors depending on the color palette. A secondary color is not limited to green, purple, and orange.

Additionally, in one or more embodiments, the color palette generation system 106 generates a neutral color for the custom color palette by determining a centroid for the gamut polygon. In some embodiments, a neutral color is to a muted, complimentary, non-competing color. For instance, a neutral color includes a shade that appears to lack color and compliments primary and secondary colors. Thus, the palette generation system can determine neutral colors generated by mixing each primary color from a color palette. In particular, the palette generation system can determine a neutral color by finding a centroid of a gamut polygon in a color space. In addition, or in the alternative, a neutral color can be a color determined by utilizing a physically-based color mixing model to mix each primary color for a color palette. To illustrate, a neutral can be relative to a color palette and accordingly can include a variety of colors depending on the color palette. A neutral color is not limited to beige, navy, black, or brown.

As just mentioned, in one or more embodiments, the color palette generation system 106 determines secondary and neutral colors for the custom color palette utilizing a physically-based color mixing model. More specifically, in some embodiments, the color palette generation system 106 utilizes a physically-based color mixing model that emulates the behavior of pigments by simulating the particles within a physical pigment. To illustrate, in some embodiments, a physically-based color mixing model simulates the particles in primary colors and simulates how light reflects off of those particles when mixed in order to determine a resulting color from the mix. The color palette generation system can offer flexibility to choose between a physically-based color mixing model or a geometrically based mixing model. For instance, the color palette generation system can provide a user interface with selectable options to choose between a physically-based color mixing model or a geometrically based mixing model. In some implementations, the color palette generation system utilizes both the physically-based color mixing model and the geometrically based mixing model for generating different colors. For example, the color palette generation system can utilize the physically-based color mixing model for generating secondary colors (or other colors) and the geometrically based mixing model for generating a neutral color (or other colors).

As also shown in FIG. 2, the color palette generation system 106 can perform an act 208 of generating and providing color mixing strings for the color palette. In one or more embodiments, the color palette generation system 106 generates darker and lighter shades for each color in the custom color palette to generate mixing strings. As shown in FIG. 2, the color palette generation system 106 generates three lighter shades and two darker shades for each color in the custom color palette. However, it will be understood that the color palette generation system 106 can generate a variety of numbers of shades to varying degrees.

In some embodiments a color mixing string refers to a group of colors with different tonal values. In particular, a color mixing string can include a grouping of colors with varying lightness but otherwise similar color attributes. To illustrate, a color mixing string can include a color palette color, lighter tones generated by mixing with a palette-white, and darker tones generated by reducing a lightness value of the color palette color.

As shown in FIG. 2, in one or more embodiments, the color palette generation system 106 organizes the mixing strings. Further, in some embodiments, the color palette generation system 106 provides the mixing strings for each color in the custom color palette in a graphical user interface. Accordingly, the color palette generation system 106 can automatically provide various shades for the custom color palette in an accurately organized manner.

Figure 3:
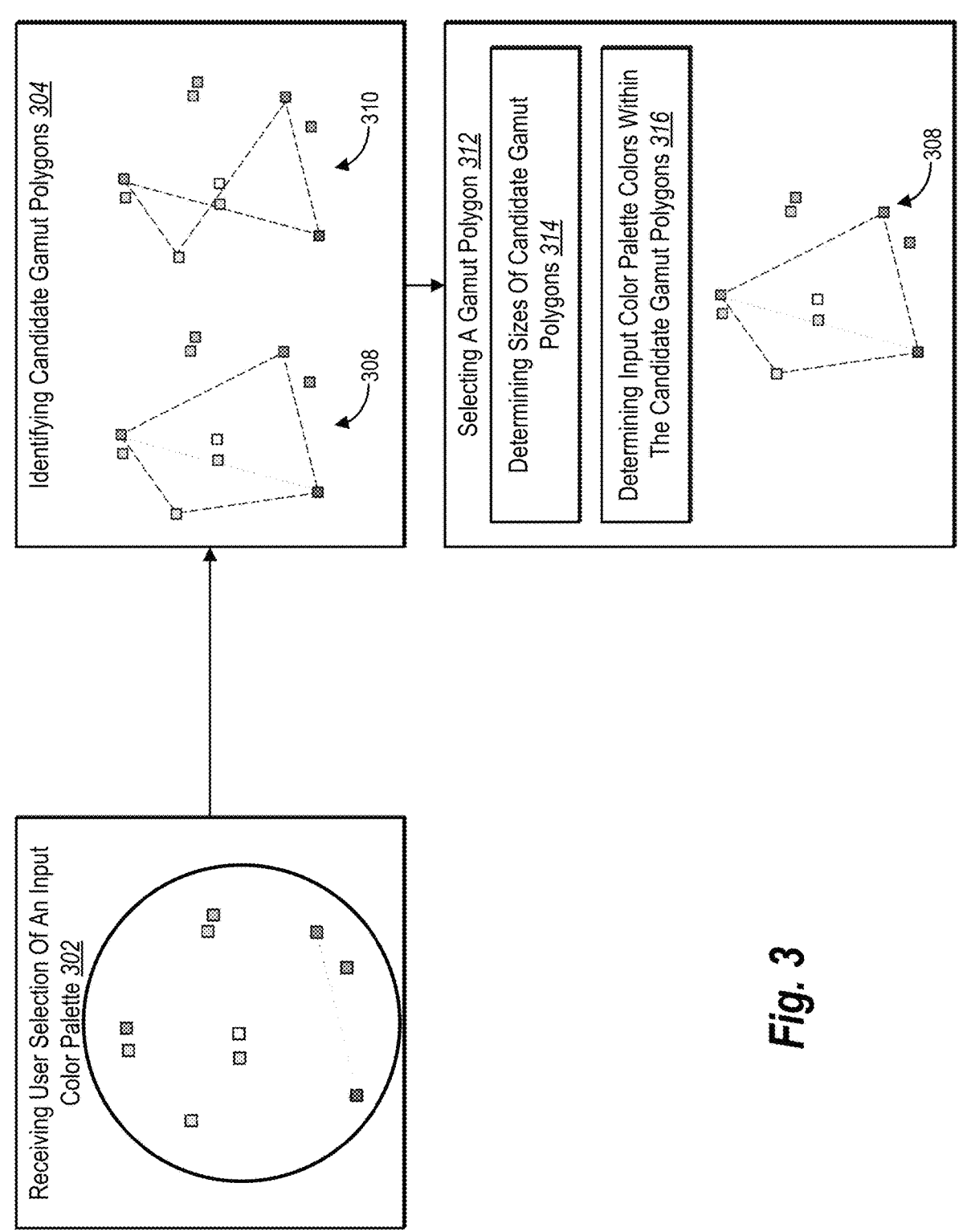
FIG. 3 illustrates a process for generating a gamut polygon based on an input color palette in accordance with one or more embodiments.

As mentioned above, the color palette generation system 106 can generate a gamut polygon. FIG. 3 provides additional detail for the process of generating a gamut polygon. As shown in FIG. 3, the color palette generation system 106 can perform an act 302 of receiving selection of an input color palette. In one or more embodiments, the color palette generation system 106 receives user selection of a set of colors for the input colors. The color palette generation system 106 can utilize a variety of input color palettes of various sizes, scopes, and gamuts.

As mentioned briefly above, the color palette generation system 106 can receive user selection of individual colors and/or an existing input color palette. More specifically, in one or more embodiments, the color palette generation system 106 receives user selection of individual colors within a color space. In another embodiment, the color palette generation system 106 can receive user selection of colors through a color identification code in a color system such as an RGB code, a CMYK code, or a HEX code.

Additionally, the color palette generation system 106 can determine an existing color palette from a digital document or image, from a variety of file types including color data, or from a previously saved palette. In various embodiments, the color palette generation system 106 can receive input color palettes from third-party systems. In addition, or in the alternative, the color palette generation system 106 can receive user selection of an input color palette from storage native to the color palette generation system 106.

As shown in FIG. 3, in one or more embodiments, the color palette generation system 106 maps each color from the input color palette onto a color space. The color palette generation system 106 can utilize a variety of color models, including HSL, HSV, RGB, CMYK, hexachrome, YUV, or another color model. The color palette generation system 106 determines coordinates for each of the set of colors in the input color palette. In some embodiments, the color palette generation system 106 discards one or more color attributes in order to map the colors onto a color space. For example, in some embodiments, the color palette generation system 106 discards lightness or value of the colors. Accordingly, the color palette generation system 106 can utilize the coordinates of the colors from the input color palette to generate a gamut polygon for a custom color palette based on the input color palette.

As shown in FIG. 3, in one or more embodiments, the color palette generation system 106 performs an act 304 of identifying candidate gamut polygons. In some embodiments, the color palette generation system 106 determines candidate gamut triangles. Further, in one or more embodiments, the color palette generation system 106 generate candidate gamut quadrilaterals if no candidate gamut triangle is suitable.

Additionally, as shown in FIG. 3, in one or more embodiments, the color palette generation system 106 performs an act 312 of selecting a gamut polygon. As also shown in FIG. 3, in one or more embodiments, the act 312 includes an act 316 of determining input color palette colors within the candidate gamut polygons. In some embodiments, the color palette generation system 106 determines candidate gamut triangles by determining each combination of three colors from the input color palette. The color palette generation system 106 selects a gamut polygon by evaluating each candidate gamut triangle.

To illustrate, in one or more embodiments, the color palette generation system 106 checks, for each candidate gamut triangle, whether each color from the input color palette is encompassed within a threshold distance of the candidate gamut triangle (e.g., if expanding the candidate gamut triangle by the threshold would encompass all of the input colors or if the input colors fall within a threshold distance of the candidate gamut triangle). In some embodiments, the color palette generation system 106 eliminates from consideration any candidate gamut triangle having at least one color from the input color palette that is not encompassed within a threshold distance of the color palette generation system 106. In one or more embodiments, the threshold distance is a default distance. In addition, in some embodiments, the color palette generation system 106 can receive a threshold distance from a user and/or an administrator.

If the color palette generation system 106 determines that more than one candidate gamut triangle encompasses each color from the input color palette within a threshold distance of the candidate gamut triangle, the color palette generation system 106 can select, as the gamut polygon, the candidate gamut triangle based on area (e.g., the candidate gamut triangle having the greatest area). However, if the color palette generation system 106 determines that no candidate gamut triangle encompasses each color from the input color palette within a threshold distance of the candidate gamut triangle, the color palette generation system 106 can move on to generate candidate gamut quadrilaterals.

To generate candidate gamut quadrilaterals, the color palette generation system 106 determines all combinations of four colors from the input color palette. Additionally, in some embodiments, the color palette generation system 106 determines all possible permutations for each combination. More specifically, in one or more embodiments, the act 312 includes an act 314 of determining sizes of candidate gamut polygons. To illustrate, candidate gamut quadrilateral 308 and candidate gamut quadrilateral 310 have the same vertices. However, the color palette generation system 106 can select the candidate gamut quadrilateral having the largest area. Accordingly, the color palette generation system 106 selects the candidate gamut quadrilateral 308 as the gamut polygon.

In one or more embodiments, the color palette generation system 106 does not check candidate gamut quadrilaterals for encompassing input color palette colors within a threshold distance. However, in some embodiments, the color palette generation system 106 moves on to candidate gamut pentagons upon determining that no candidate gamut quadrilateral encompasses each color from the input color palette within a threshold distance of the candidate gamut quadrilateral. Indeed, the color palette generation system 106 can implement a threshold for checking input color palette colors within a threshold distance for a variety of sides of a polygon (and can stop at a variety of polygon sidedness).

For instance, in one or more implementations, the color palette generation system 106 implements the following computer-implemented algorithm in generating a gamut polygon:
1. Find all combinations of 3 colors for the input palette
2. For each combination, determine which colors are inside the triangular gamut.
3. For each out-of-gamut color, find its distance to the perimeter of the gamut.
4. If the distance is smaller than a threshold, mark the color as within gamut.
5. If there are no out-of-gamut colors after Step 4, add current combination to the list of candidates.

If there are still out-of-gamut colors after Step 4, search for quads:
1. Find all combinations of 4 colors for the input palette.
2. For each combination, compute all possible permutations.
3. For each permutation, compute the area enclosed within the quad.
4. Select permutation with the biggest area.

Figure 4:
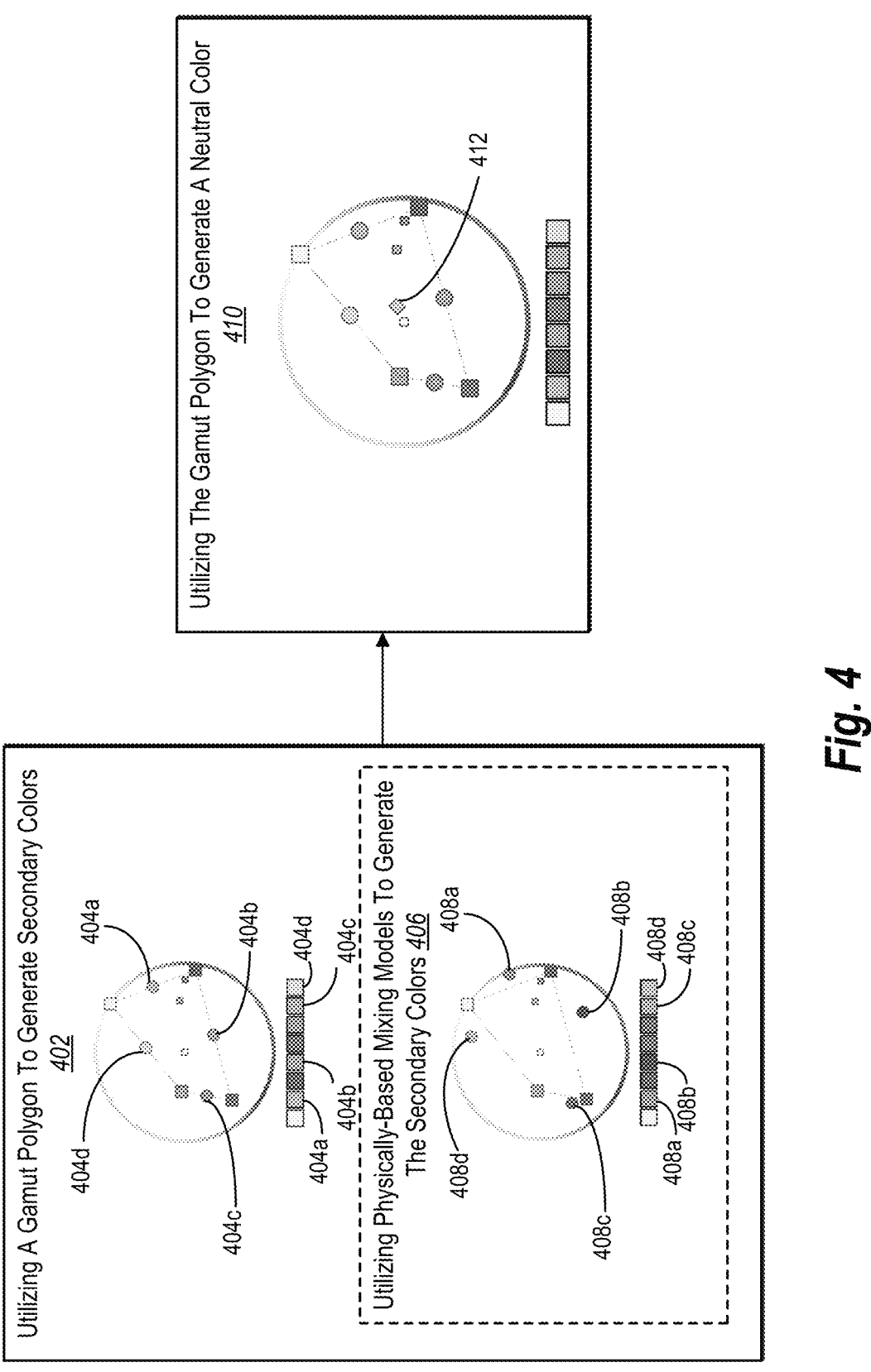
FIG. 4 illustrates a process for utilizing a gamut polygon to generate secondary colors and a neutral color in accordance with one or more embodiments.

Upon generating a gamut polygon, in one or more embodiments, the color palette generation system 106 utilizes the gamut polygon to generate a custom color palette based on the input color palette. More specifically, in some embodiments, the color palette generation system 106 determines primary colors, secondary colors, and one or more neutral colors for a custom color palette based on the input color palette. FIG. 4 provides additional detail for the process of generating these secondary colors and a neutral color in accordance with one or more embodiments.

In some implementations, the color palette generation system 106 designates the colors at the vertices of the gamut polygon as primary colors for the custom color palette. As mentioned above, primary colors can include a color at a vertex of a gamut polygon and need not be red, blue, or yellow. In one or more embodiments, the color palette generation system 106 utilizes the gamut polygon and/or the primary colors to determine the secondary colors and the neutral color.

As shown in FIG. 4, in one or more embodiments, the color palette generation system 106 performs an act 402 of utilizing a gamut polygon to generate secondary colors. To illustrate, in one or more embodiments, the color palette generation system 106 converts coordinates of the locations of the primary colors in the color space into cartesian coordinates. For example, in HSV, the color palette generation system 106 simplifies the interpolation of polar hue and saturation values. In addition, or in the alternative, the color palette generation system 106 can utilize a color space that already utilizes cartesian coordinates, such as HSL.

Further, to determine the secondary colors for the custom color palette, the color palette generation system 106 determines a midpoint for each side of the gamut polygon utilizing the determined cartesian coordinates. For instance, as shown in FIG. 4, the color palette generation system 106 determines the secondary colors 404a-404d by determining a midpoint for each side of the gamut polygon. Upon generating the secondary colors 404a-404d, the color palette generation system 106 includes the colors in the custom color palette.

As shown in FIG. 4, in one or more embodiments, the color palette generation system 106 performs an optional act 406 of utilizing physically-based color mixing models to generate the secondary colors. To illustrate, the color palette generation system 106 can mix the primary colors from each side of the gamut polygon in a physically-based color mixing model in order to determine the secondary colors. As shown in FIG. 4, the color palette generation system 106 utilizes a physically-based color mixing model to determine secondary colors 408a-408d. Because the color palette generation system 106 utilized the physical-based color mixing model to determine the secondary colors 408a-408d, the secondary colors 408a-408d may not fall exactly at the midpoints of the sides of the gamut polygon.

In some embodiments, the color palette generation system 106 can prepare custom color palettes to simulate mixing in a particular medium. For example, the color palette generation system 106 can utilize a variety of color mixing models that simulate mixing for various mediums, such as watercolor, oil paints, ink, acrylic paint, chalk, pencil, or another art medium. In some embodiments, the color palette generation system 106 can utilize a medium type based on a user selection.

In one or more embodiments, the color palette generation system 106 utilizes a physically-based mixing model that utilizes alpha compositing and/or pigment modelling. To illustrate, in some embodiments, the color palette generation system 106 utilizes a physically-based color mixing model that models various types of pigments by simulating the particles within a physical pigment. More specifically, the color palette generation system 106 can utilize a selected medium type to model the reflection of light off of particles within the pigment of the medium. To illustrate, in some embodiments, a physically-based color mixing model simulates the particles in primary colors and simulates how light reflects off of those particles when mixed in order to determine a resulting color from the mix. Accordingly, the color palette generation system 106 can utilize the physically-based mixing model to mix primary colors from each side of a gamut polygon to determine secondary colors and/or mix all primary colors to determine a neutral color. The color palette generation system 106 can thus utilize the physically-based mixing model to mix different materials (e.g., water color, oils, acrylics) and physically model the resulting color. Thus, the color palette generation system 106 can generate color palettes that consider and accurately reflect interactions and color combinations across different materials. The color palette generation system 106 can utilize a variety of physically-based color mixing models such as ADOBE FRESCO or MIXCOLORS, Further, as shown in FIG. 4, in some embodiments, the color palette generation system 106 performs an act 410 of utilizing the gamut polygon to generate a neutral color. In some embodiments, the color palette generation system 106 determines a centroid of the gamut polygon. For example, as shown in FIG. 4, the color palette generation system 106 determines the neutral color 412 by determining the centroid of the gamut polygon. In addition, or in the alternative, in one or more embodiments, the color palette generation system 106 determines the neutral color by mixing together the primary colors of the gamut polygon in a physically-based color mixing model. As mentioned above, the color palette generation system 106 can utilize a color mixing model that simulates color mixing in a particular medium.

Figure 5:
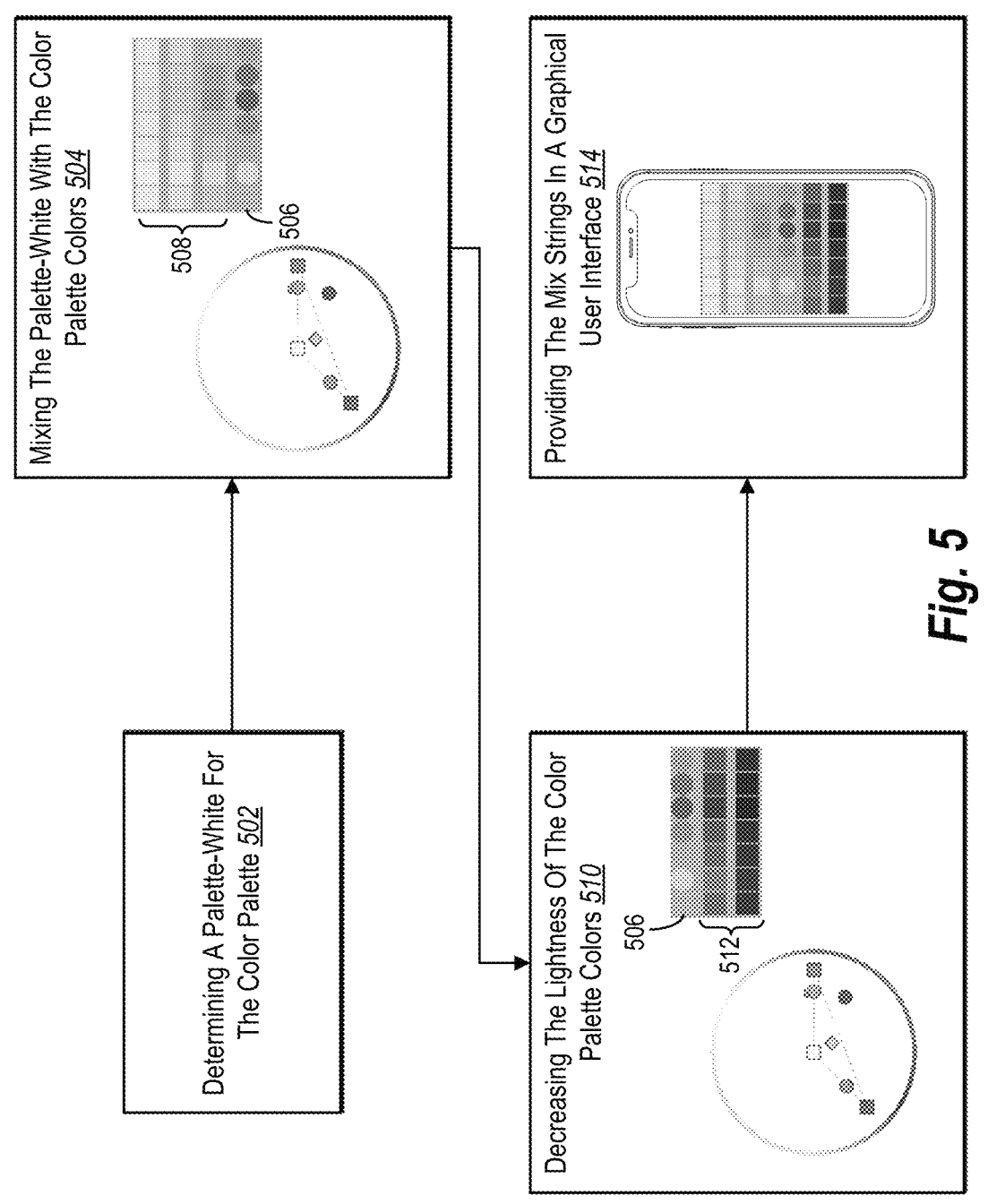
FIG. 5 illustrates a process for generating mixing strings in accordance with one or more embodiments.

In one or more embodiments, the color palette generation system 106 generates and provides mixing strings for the colors in a color palette. FIG. 5 illustrates an example process for generating and providing color mixing strings for a custom color palette in a graphical user interface. More specifically, the color palette generation system 106 can generate mixing strings for each color in a color palette. To illustrate, the color palette generation system 106 can generate color mixing strings for each color palette color. In one or more embodiments, the color palette colors include the colors from the input color palette (including the primary colors), the secondary colors, and the neutral color.

As shown in FIG. 5, in one or more embodiments, the color palette generation system 106 performs an act 502 of determining a palette-white for the color palette. In some embodiments, the color palette generation system 106 selects a palette white by checking the custom color palette for a color within a threshold distance of pure white. Upon determining that the custom color palette has a color within a threshold distance of pure white, the color palette generation system 106 can designate that color as the palette-white.

Based on determining that the custom color palette does not have a color within a threshold distance of pure white, the color palette generation system 106 can designate pure white as the palette white. In addition, or in the alternative, the color palette generation system 106 can determine a palette-white for the custom color palette. In one or more embodiments, the color palette generation system 106 determines a palette-white utilizing one or more attributes of the colors from the custom color palette. For example, the color palette generation system 106 can determine an average hue of the color palette and generate a palette white by generating a warmer white or cooler white based on the average hue of the custom color palette.

Upon determining the palette-white, in one or more embodiments, the color palette generation system 106 performs an act 504 of mixing the palette white with the color palette colors. In one or more embodiments, the color palette generation system 106 generates lighter shades for a mixing string of a color by mixing varying proportions of the color and the palette-white. For example, in FIG. 5, the color palette generation system 106 generates lighter shades 508 for each of the color palette colors 506. As shown in FIG. 5, the color palette generation system 106 generates three lighter shades 508 for each of the color palette colors 506. However, it will be appreciated that the color palette generation system 106 can generate a variety of numbers of lighter shades with a variety of proportions of palette-white to color palette color.

Further, in one or more embodiments, the color palette generation system 106 performs an act 510 of decreasing the lightness of the color palette colors. To illustrate, the color palette generation system 106 generates darker shades by decreasing the lightness of the color palette colors to varying degrees. For example, as shown in FIG. 5, the color palette generation system 106 generates darker shades 512 by decreasing the lightness of the color palette colors 506. In FIG. 5, the color palette generation system 106 generates to darker shades 512 for each of the color palette colors 506. However, it will be appreciated that the color palette generation system 106 can generate a variety of numbers of darker shades with a variety of degrees of decreased lightness.

Upon generating the lighter shades and darker shades for each color palette color, in one or more embodiments, the color palette generation system 106 performs an act 514 of providing the mixing strings in a graphical user interface. As shown in FIG. 5, the color palette generation system 106 provides the color mixing strings in vertical lines with each row of shades and color palette colors aligned. However, the color palette generation system 106 can generate a variety of arrangements for the mixing strings. For example, the color palette generation system 106 can orient the color mixing strings horizontally. In another example, the color palette generation system 106 can generate the graphical user interface to provide the color mixing string corresponding to a color palette color in response to user selection of a graphical user interface element corresponding to the color palette color.

Figure 6:
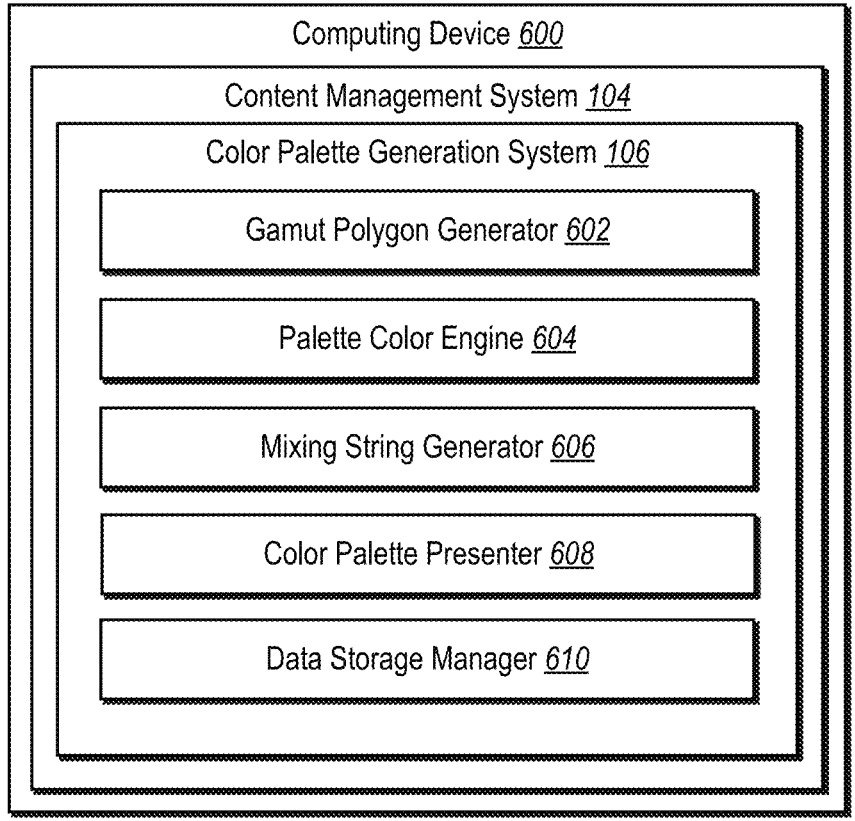
FIG. 6 illustrates a schematic diagram of a color palette generation system in accordance with one or more embodiments.

Turning to FIG. 6, additional detail will be provided regarding exemplary components 602-610 of the color palette generation system 106. Each of the components 602-610 of the color palette generation system 106 can include software, hardware, or both. For example, the components 602-610 can include one or more instructions stored on a computer-readable storage medium and executable by processors of one or more computing devices, such as a client device or server device. When executed by the one or more processors, the computer-executable instructions of the color palette generation system 106 can cause the computing device(s) to perform the methods described herein. Alternatively, the components 602-610 can include hardware, such as a special-purpose processing device to perform a certain function or group of functions. Alternatively, the components 602-610 of the color palette generation system 106 can include a combination of computer-executable instructions and hardware.

As shown in FIG. 6, the content management system 104 and the color palette generation system 106 can be implemented via a computing device 600 (e.g., the server(s) 102 and/or the client device 108). In one or more embodiments, the color palette generation system 106 includes a gamut polygon generator 602. In some embodiments, the gamut polygon generator 602 determines candidate gamut polygons. Further, the gamut polygon generator 602 can evaluate candidate gamut triangles by selecting a gamut triangle having the largest area and verifying that each color palette color falls within a threshold distance of the gamut triangle. If the gamut polygon generator 602 determines that at least one color palette color does not fall within a threshold distance of the gamut polygon, the gamut polygon generator 602 can generate candidate gamut quadrilaterals. Further, in one or more embodiments, the gamut polygon generator 602 selects the candidate gamut quadrilateral having the largest area.

Further, as shown in FIG. 6, in one or more embodiments, the color palette generation system 106 includes a palette color engine 604. In one or more embodiments, the palette color engine 604 generates secondary colors and a neutral color for color palettes. In one or more embodiments, the palette color engine 604 determines the secondary colors by determining a midpoint between primary colors of the color palette. Further, in some embodiments, the palette color engine 604 determines a neutral color by determining a centroid of the gamut polygon. In addition, or in the alternative, the palette color engine 604 can determine the secondary colors and/or the neutral color utilizing a physically-based color mixing model.

Additionally, as shown in FIG. 6, in some embodiments, the color palette generation system 106 includes a mixing string generator 606. To illustrate, in one or more embodiments, the mixing string generator 606 determines a palette-white. Further, in some embodiments, the mixing string generator 606 mixes different proportions of the palette-white to generate lighter shades for each of the color palette colors. Additionally, in one or more embodiments, the mixing string generator 606 decreases the lightness of each color palette color to various degrees to generate darker shades.

As also shown in FIG. 6, in one or more embodiments, the color palette generation system 106 includes a color palette presenter 608. In some embodiments, the color palette presenter 608 determines organizations of color palette colors and/or mixing strings. Further, in one or more embodiments, the color palette presenter 608 generates a graphical user interface including the color palette and/or the mixing strings for presentation on a client device.

In some embodiments, the color palette generation system 106 also includes the data storage manager 610. The data storage manager 610 maintains data for the color palette generation system 106. The data storage manager 612 (e.g., via one or more memory devices) maintains data of any type, size, or kind, as necessary to perform the functions of the color palette generation system 106. For example, the data storage facility 924 includes input color palettes, gamut polygons, primary colors, secondary colors, neutral colors, color palette colors, palette-whites, mixing strings, and organizations of mixing strings and/or color palette colors.

Furthermore, the components 602-610 of the color palette generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-610 may be implemented as a stand-alone application, such as a desktop or mobile application. Furthermore, the components 602-610 may be implemented as one or more web-based applications hosted on a remote server. The components 602-610 may also be implemented in a suite of mobile device applications or "apps."

To illustrate, the components 602-610 may be implemented in an application, including but not limited to ADOBE FRESCO, ADOBE PHOTOSHOP, ADOBE PHOTOSHOP EXPRESS, ADOBE PHOTOSHOP LIGHTROOM, ADOBE ILLUSTRATOR, ADOBE ANIMATE, and ADOBE AFTER EFFECTS. The foregoing are either registered trademarks or trademarks of Adobe Inc. in the United States and/or other countries.

Figure 7:
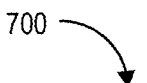
FIG. 7 illustrates a flowchart of a series of acts for providing the color mixing string for display in accordance with one or more embodiments.
Figure 7:
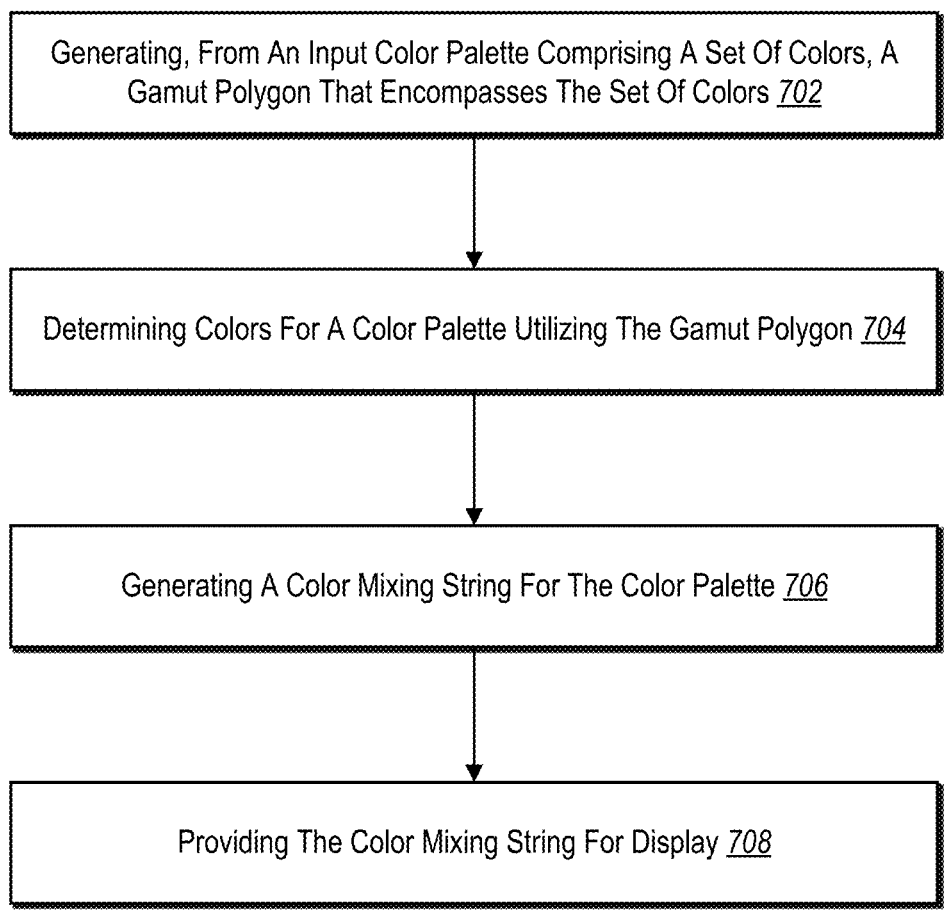

FIGS. 1-6, the corresponding text, and the examples provide a number of different methods, systems, devices, and non-transitory computer-readable media of the color palette generation system 106. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating and utilizing a gamut polygon to determine a custom color palette in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 702 for generating, from an input color palette comprising a set of colors, a gamut polygon that encompasses the set of colors. In particular, the act 702 can include generating, from an input color palette comprising a set of colors, a gamut polygon that encompasses the set of colors within a color space. Specifically, the act 702 can include receiving user selection of an input color palette comprising a set of colors.

Further, in one or more embodiments, the act 702 includes determining that each of the set of colors are encompassed by the gamut polygon within a threshold distance within the color space. Additionally, in some embodiments, the act 702 includes converting the set of colors from the input color palette into coordinates in the color space, and generating candidate triangle gamut polygons for different combinations of three vertices from the coordinates of the set of colors. Also, the act 702 can include converting the set of colors from the input color palette into coordinates in the color space, and generating the plurality of candidate gamut polygons by sampling vertices from the coordinates of the set of colors in the color space.

The act 702 can also include determining that at least one color from the set of colors is not within a threshold distance of the candidate triangle gamut polygons, and in response to determining that the at least one color is not within the threshold distance of the candidate triangle gamut polygons, generating candidate quadrilateral gamut polygons for different combinations of four vertices from the coordinates. Further, the act 702 can include selecting the gamut polygon by selecting a candidate quadrilateral gamut polygon having a largest area. The act 702 can also include determining a candidate gamut polygon having a largest area for which each of the set of colors are encompassed by the candidate gamut polygon within a threshold distance within the color space.

Additionally, as shown in FIG. 7, the series of acts 700 includes an act 704 for determining colors for a color palette utilizing the gamut polygon. In particular, the act 704 can include determining primary colors, secondary colors, and a neutral color utilizing the gamut polygon. Specifically, the act 704 can include generating, from the input color palette, a gamut polygon within a color space by extracting subsets of colors from the set of colors of the input color palette, identifying a plurality of candidate gamut polygons for the subsets of colors, and selecting the gamut polygon based on sizes of the plurality of candidate gamut polygons within the color space and numbers of the set of colors encompassed by the plurality of candidate gamut polygons.

In one or more embodiments, the act 704 also includes converting the primary colors into locations in the color space, and determining the secondary colors by determining one or more midpoints between the locations of the primary colors. Further, the act 704 can include converting the primary colors into coordinates in the color space, and generating the neutral color by determining a centroid for the coordinates of the primary colors. Additionally, the act 704 can include determining the secondary colors or the neutral color from the primary colors of the gamut polygon utilizing a physically-based color mixing model.

Additionally, in one or more embodiments, the act 704 includes utilizing the gamut polygon to generate a color palette comprising primary colors, secondary colors, and a neutral color. Further, in one or more embodiments, the act 704 includes determining the primary colors from vertices of the gamut polygon, determining the secondary colors from edges of the gamut polygon, and generating the neutral color from a center of the gamut polygon. Similarly, the act 704 can include determining the primary colors by selecting the primary colors from vertices of the gamut polygon, determining the secondary colors by selecting the secondary colors from edges of the gamut polygon, and determining the neutral color by selecting the neutral color from an interior of the gamut polygon.

Further, as shown in FIG. 7, the series of acts 700 includes an act 706 for generating a color mixing string for the color palette. In particular, the act 706 can include generating a color mixing string from the primary colors, the secondary colors, and the neutral color. Specifically, the act 706 can include generating a color mixing string utilizing the gamut polygon.

Additionally, in one or more embodiments, the act 706 includes generating a palette-white by searching the primary colors, the secondary colors, and the neutral color for a color within a threshold distance from pure white. The act 706 can also include generating the color mixing string for a color palette with palette colors comprising the primary colors, the secondary colors, and the neutral color by mixing the palette-white with the palette colors to produce lighter shades, and reducing a lightness of the palette colors to produce darker shades.

Also, as shown in FIG. 7, the series of acts 700 includes an act 708 for providing the color mixing string for display. In particular, the act 708 can include providing the color mixing string for display via a user interface of a client device. Specifically, the act 708 can include generating a digital design document comprising colored elements based on user interaction with the color mixing string.

Accordingly, in one or more implementations, the series of acts 700 includes generating, from an input color palette comprising a set of colors, a gamut polygon that encompasses the set of colors within a color space; determining a plurality of primary colors, one or more secondary colors, and a neutral color utilizing the gamut polygon; generating a color mixing string from the plurality of primary colors, the one or more secondary colors, and the neutral color; and providing the color mixing string for display via a user interface of a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
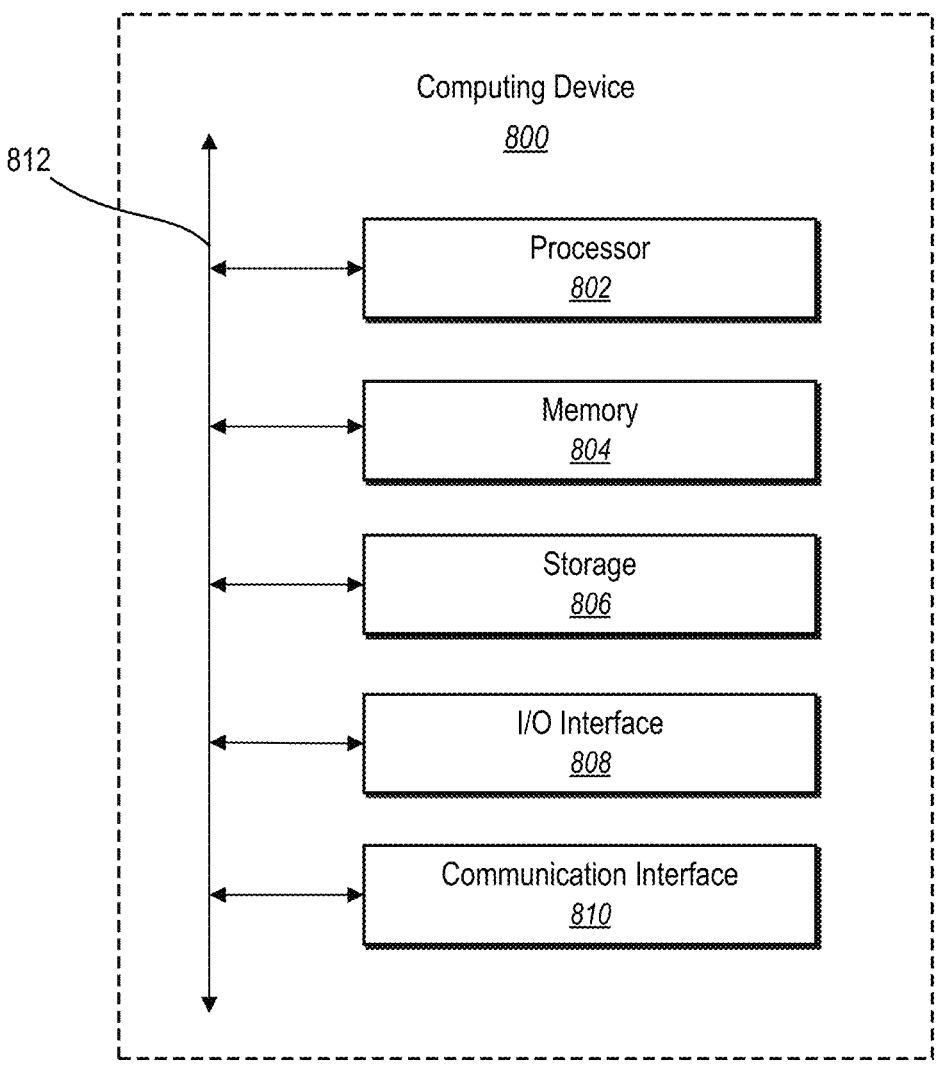
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., computing device 600, server(s) 102, and client device 108. In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8.

Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, from an input color palette comprising a set of colors, a gamut polygon that encompasses the set of colors within a color space by:
identifying a plurality of candidate gamut polygons for subsets of colors within the input color palette;
determining, based on the plurality of candidate gamut polygons for the subsets of colors, sizes of the plurality of candidate gamut polygons within the color space and numbers of the set of colors within the color space encompassed by the plurality of candidate gamut polygons; and
selecting the gamut polygon based on the determined sizes of the plurality of candidate gamut polygons within the color space and the determined numbers of the set of colors encompassed by the plurality of candidate gamut polygons;
determining a plurality of primary colors, one or more secondary colors, and a neutral color utilizing the gamut polygon;
generating a color mixing string from the plurality of primary colors, the one or more secondary colors, and the neutral color; and
providing the color mixing string for display via a user interface of a client device.

2. The method of claim 1, wherein generating the gamut polygon further comprises determining that each of the set of colors are encompassed by the gamut polygon within a threshold distance within the color space.

3. The method of claim 1, further comprising:
converting the plurality of primary colors into locations in the color space; and
determining the one or more secondary colors by determining one or more midpoints between the locations of the plurality of primary colors.

4. The method of claim 1, further comprising:
converting the plurality of primary colors into coordinates in the color space; and
generating the neutral color by determining a centroid for the coordinates of the plurality of primary colors.

5. The method of claim 1, further comprising determining the one or more secondary colors or the neutral color from the plurality of primary colors of the gamut polygon utilizing a physically-based color mixing model.

6. The method of claim 1, further comprising generating a palette-white by searching the plurality of primary colors, the one or more secondary colors, and the neutral color for a color within a threshold distance from pure white.

7. The method of claim 6, further comprising generating the color mixing string for a color palette with palette colors comprising the plurality of primary colors, the one or more secondary colors, and the neutral color by:

mixing the palette-white with the palette colors to produce lighter shades; and reducing a lightness of the palette colors to produce darker shades.

8. A system comprising:

a memory component; and one or more processing devices coupled to the memory component, the one or more processing devices to perform operations comprising:

receiving user selection of an input color palette comprising a set of colors;

generating, from the input color palette, a gamut polygon within a color space by:

extracting subsets of colors from the set of colors of the input color palette;

identifying a plurality of candidate gamut polygons for the subsets of colors;

determining, based on the plurality of candidate gamut polygons for the subsets of colors, sizes of the plurality of candidate gamut polygons within the color space and numbers of the set of colors within the color space encompassed by the plurality of candidate gamut polygons; and selecting the gamut polygon based on the determined sizes of the plurality of candidate gamut polygons within the color space and the determined numbers of the set of colors encompassed by the plurality of candidate gamut polygons; and generating a color mixing string utilizing the gamut polygon.

9. The system of claim 8, wherein the operations further comprise generating the gamut polygon by:

converting the set of colors from the input color palette into coordinates in the color space; and generating the plurality of candidate gamut polygons by sampling vertices from the coordinates of the set of colors in the color space.

10. The system of claim 9, wherein the operations further comprise generating the gamut polygon by determining a candidate gamut polygon having a largest area for which each of the set of colors are encompassed by the candidate gamut polygon within a threshold distance within the color space.

11. The system of claim 8, wherein the operations further comprise utilizing the gamut polygon to generate a color palette comprising primary colors, secondary colors, and a neutral color.

12. The system of claim 11, wherein the operations further comprise:

determining the primary colors from vertices of the gamut polygon;

determining the secondary colors from edges of the gamut polygon; and generating the neutral color from a center of the gamut polygon.

13. The system of claim 11, wherein the operations further comprise generating the color mixing string for palette colors of the color palette by:

generating a palette-white for the color palette by searching the color palette for a color within a threshold distance from pure white;

mixing the palette-white with the palette colors to produce lighter shades; and reducing a lightness of the palette colors to produce darker shades.

14. A non-transitory computer-readable medium comprising instructions that, when executed by a processing device, cause the processing device to perform operations comprising:

generating, from an input color palette comprising a set of colors, a gamut polygon that encompasses the set of colors within a color space by:

identifying a plurality of candidate gamut polygons for subsets of colors within the input color palette;

determining, based on the plurality of candidate gamut polygons for the subsets of colors, sizes of the plurality of candidate gamut polygons within the color space and numbers of the set of colors within the color space encompassed by the plurality of candidate gamut polygons; and selecting the gamut polygon based on the determined sizes of the plurality of candidate gamut polygons within the color space and the determined numbers of the set of colors encompassed by the plurality of candidate gamut polygons;

determining primary colors, secondary colors, and a neutral color utilizing the gamut polygon;

generating a color mixing string from the primary colors, the secondary colors, and the neutral color; and providing the color mixing string for display via a user interface of a client device.

15. The non-transitory computer-readable medium of claim 14, wherein the operations further comprise utilizing the gamut polygon to generate a color palette by:

determining the primary colors by selecting the primary colors from vertices of the gamut polygon;

determining the secondary colors by selecting the secondary colors from edges of the gamut polygon; and determining the neutral color by selecting the neutral color from an interior of the gamut polygon.

16. The non-transitory computer-readable medium of claim 15, wherein the operations further comprise:

converting the set of colors from the input color palette into coordinates in the color space; and generating candidate triangle gamut polygons for different combinations of three vertices from the coordinates of the set of colors.

17. The non-transitory computer-readable medium of claim 16, wherein the operations further comprise:

determining that at least one color from the set of colors is not within a threshold distance of the candidate triangle gamut polygons; and in response to determining that the at least one color is not within the threshold distance of the candidate triangle gamut polygons, generating candidate quadrilateral gamut polygons for different combinations of four vertices from the coordinates.

18. The non-transitory computer-readable medium of claim 17, wherein the operations further comprise selecting the gamut polygon by selecting a candidate quadrilateral gamut polygon having a largest area.

19. The non-transitory computer-readable medium of claim 15, wherein the operations further comprise determining the secondary colors and the neutral color by combining the primary colors utilizing a physically-based color mixing model.

20. The non-transitory computer-readable medium of claim 14, wherein the operations further comprise generating a digital design document comprising colored elements based on user interaction with the color mixing string.

\* \* \* \* \*